US008819042B2

(12) United States Patent
Samudrala et al.

(10) Patent No.: US 8,819,042 B2
(45) Date of Patent: Aug. 26, 2014

(54) ENHANCED DATA COMPARISON TOOL (75) Inventors: Subasree Samudrala, Charlotte, NC (US); Satish Vvn Kuchipudi, Andhra Pradesh (IN)

(73) Assignee: Bank of America Corporation, Charlotte, NC (US)

( * ) Notice: Subject to any disclaimer, the term of this patent is extended or adjusted under 35 U.S.C. 154(b) by 259 days.

(21) Appl. No.: 12/766,699

(22) Filed: Apr. 23, 2010

(65) Prior Publication Data

US 2011/0264625 A1 Oct. 27, 2011

(51) Int. Cl.
*G06F 17/30* (2006.01)

(52) U.S. Cl.
CPC .................................. *G06F 17/30557* (2013.01)
USPC .......................................................... 707/758

(58) Field of Classification Search
None
See application file for complete search history.

(56) References Cited

U.S. PATENT DOCUMENTS

| 6,236,993 | B1 | 5/2001 | Fanberg |
| 6,584,477 | B1 | 6/2003 | Mosher |
| 7,379,978 | B2 | 5/2008 | Anderson et al. |
| 7,403,942 | B1* | 7/2008 | Bayliss ........................ 707/748 |
| 2002/0087588 | A1 | 7/2002 | McBride et al. |
| 2006/0004528 | A1* | 1/2006 | Uehara et al. .................. 702/20 |
| 2006/0222160 | A1 | 10/2006 | Bank et al. |
| 2008/0208855 | A1* | 8/2008 | Lingenfelder et al. ............ 707/6 |
| 2008/0313204 | A1 | 12/2008 | Schultz et al. |
| 2010/0070377 | A1 | 3/2010 | Williams et al. |
| 2010/0100529 | A1 | 4/2010 | Erofeev |
| 2010/0131526 | A1* | 5/2010 | Sun et al. ...................... 707/758 |

OTHER PUBLICATIONS

Fundamentals of Database Systems, Third Edition, Ramez Elmasri and Shamkant B. Navathe, Copyright 2000, Chapter 5, pp. 113-154 and Chapter 14, pp. 465-497.
PCT International Search Report mailed Jul. 1, 2011, Application No. PCT/US 11/33012, 10 pages.

* cited by examiner

*Primary Examiner* — Bai D. Vu
(74) *Attorney, Agent, or Firm* — Banner & Witcoff, Ltd.; Michael A. Springs (57) ABSTRACT Systems and methods are illustrated for transitioning data from one data store to another data store. The transition may occur according to comparison information received through a graphical user interface. For example, the comparison information may map data or columns in a source data store to data or columns in a target data store. A score may also be generated based on a comparison of the source and target. A report may indicate a successful or failed data transition based on the score.

17 Claims, 4 Drawing Sheets

ENHANCED DATA COMPARISON TOOL

TECHNICAL FIELD

Aspects of the disclosure relate to data analysis techniques and products. More specifically, aspects of the disclosure relate to data comparison of heterogeneous data types.

BACKGROUND

Enterprise systems often require data to be uploaded into a database either through a batch process or through realtime transactions. Once the data is uploaded, it is critical to perform tests to ensure that all the data was updated successfully. Many times the testing (e.g., data validity) is performed manually. Manual testing is time consuming, error prone, and results in a large strain on the administrators of the enterprise system.

In addition, software tools are available for comparing the data of two files of the same type. For example, the data in one file may be read and compared to the data read from another file. The number of mismatches may be tabulated and displayed in a report. Such rudimentary comparison software exists and is well known to one of ordinary skill.

There also exist more sophisticated automated tools for aging a file of data. For example, aging is the process by which a program reads data from a file and advances date values in the file by a predetermined quantity of days. Techniques for aging a file are well known and were extensively used during Y2K (i.e., year 2000) testing of computer systems. Moreover, techniques are known for reading and automatically bulk converting values between different metrics (e.g., converting Centigrade to Fahrenheit) from one file to another.

There are commercially available products in the art for, inter alia, backend data testing. Some are limited in the number of database with which it can interface. A user may need to manually copy tables from other database repositories into a supported database product to compare data. In addition, there are schema limitations. Moreover, the source and target in certain products are required to be certain database tables. Regarding other products, there exist constraints on database repository volumes. Moreover, the source and destination are relational database tables with a constraint that source and target column names should be same and should be of the same data type (e.g., both should be character, if source column is character and target column is numeric; comparison can't be done.) The features disclosed herein provide benefits unavailable with the features of other products.

BRIEF SUMMARY

The following presents a simplified summary of the disclosure in order to provide a basic understanding of some aspects. It is not intended to identify key or critical elements of the invention or to delineate the scope of the invention. The following summary merely presents some concepts of the disclosure in a simplified form as a prelude to the more detailed description provided below.

In one embodiment in accordance with aspects of the disclosure a method of transitioning and comparing data is disclosed. The method may include one or more steps of: connecting a computing device to source and target systems; using comparison information to identify a mapping of the source and target; extracting data from the source and target based on the comparison information; and generating a score/report based on a comparison. In an alternate embodiment, the data may be transitioned from the source to the target based on the comparison information.

In addition, in one embodiment, a tangible computer-readable medium storing computer-executable instructions that when executed cause an electronic processor to perform one or more of the aforementioned steps from the preceding paragraph is disclosed. The computer-readable medium may be located in a computing device configured to execute the approach steps of the aforementioned method.

BRIEF DESCRIPTION OF THE DRAWINGS

The present disclosure is illustrated by way of example and not limited in the accompanying figures in which like reference numerals indicate similar elements and in which.

DETAILED DESCRIPTION

In accordance with various aspects of the disclosure, systems and methods are illustrated for data analysis techniques. More specifically, aspects of the disclosure relate to data comparison. The comparison may be done according to comparison information received through a graphical user interface. For example, the comparison information may map data or columns in a source data store to data or columns in a target data store. The comparison, in some embodiments, may be one source table with multiple target tables. The disclosure contemplates a system that compares transformation data (e.g., data in the source table may be stored in one table which might be transitioned to multiple tables in the target system) between heterogeneous data sources. In addition, the disclosure illustrates how a score may also be generated based on a comparison of the source and target. This score may be used to generate a report indicating whether a successful or failed data transition has occurred.

The systems and methods of the disclosure may be used, in one embodiment, with systems that require data to be compared between upstream and downstream databases to ensure data integrity and quality. Many large companies use more than one electronic platform or software architecture. As such, these disparate systems of a single company may require realtime or batch (e.g., nightly) updates to remain synchronized. At least some benefits of the systems and methods of the disclosure are reduced testing time, enhanced user friendliness, more accuracy, repeatability, less learning curve (e.g., prior knowledge of application), better ability to generate multiple reports in different formats, cost efficient, flexible framework for future enhancements, and less database knowledge required of testers performing backend data comparison tests.

Figure 1:
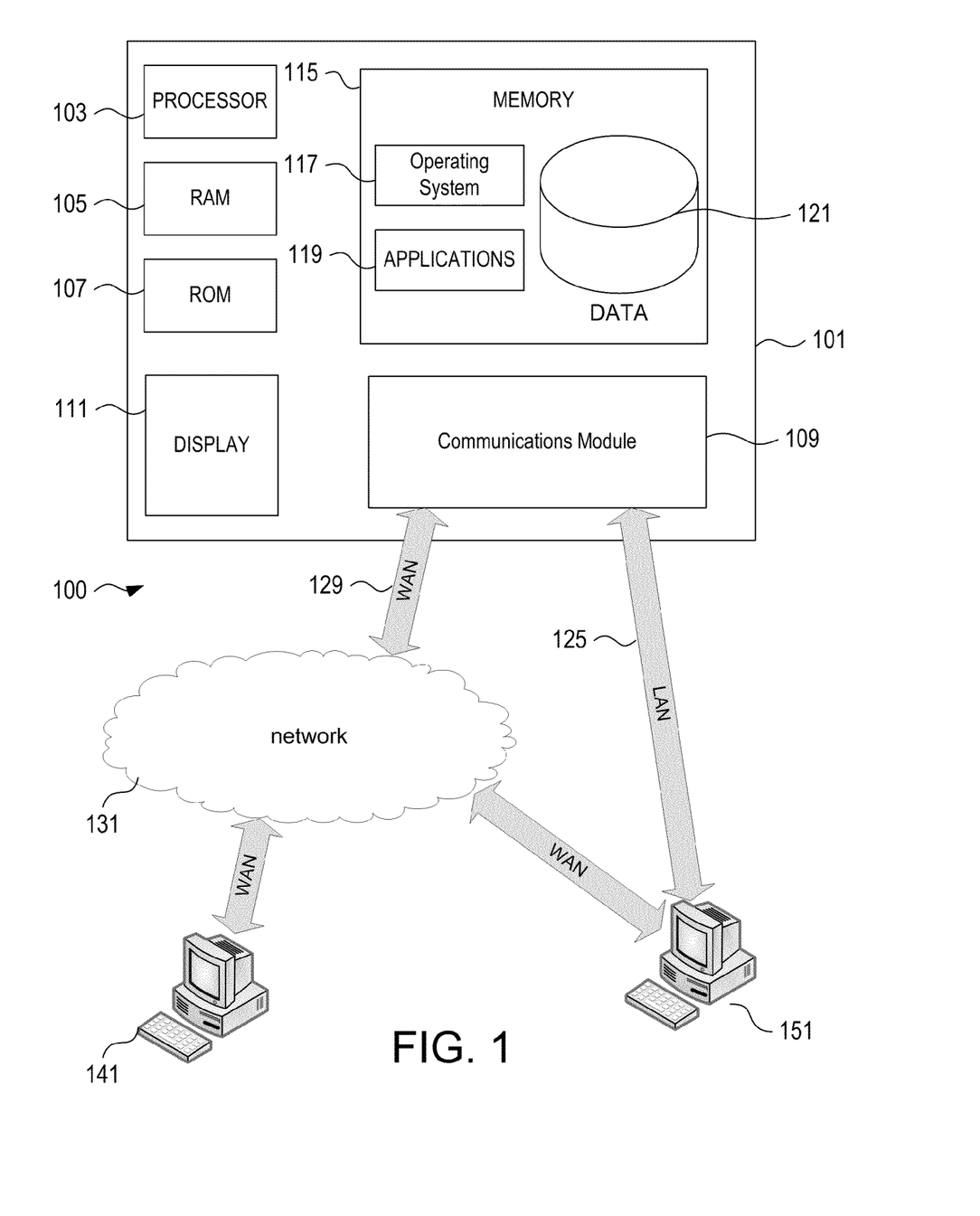
FIG. 1 illustrates a schematic diagram of a general-purpose digital computing environment in which various illustrative aspects of the disclosure may be implemented.

FIG. 1 illustrates an example of a suitable computing system environment 100 that may be used according to one or more illustrative embodiments of the invention. The computing system environment 100 is only one example of a suitable computing environment and is not intended to suggest any limitation as to the scope of use or functionality of the invention. The computing system environment 100 should not be interpreted as having any dependency or requirement relating to any one or combination of components illustrated in the computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the invention may be described in the general context of computer-executable instructions, such as program modules, being executed by a computer. Generally, program modules include routines, programs, objects, components, data structures, and the like. that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

With reference to FIG. 1, the computing system environment 100 may include a computing device 101 having a processor 103 for controlling overall operation of the computing device 101 and its associated components, including RAM 105, ROM 107, communications module 109, and memory 115. Computing device 101 typically includes a variety of computer readable media. Computer readable media may be any available media that may be accessed by computing device 101 and include both volatile and nonvolatile media, removable and non-removable media. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101. Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. Although not shown, RAM 105 may include one or more are applications representing the application data stored in RAM memory 105 while the computing device is on and corresponding software applications (e.g., software tasks), are running on the computing device 101.

Communications module 109 may include a microphone, keypad, touch screen, and/or stylus through which a user of computing device 101 may provide input, and may also include one or more of a speaker for providing audio output and a video display device 111 for providing textual, audio-visual and/or graphical output. Software may be stored within memory 115 and/or storage to provide instructions to processor 103 for enabling computing device 101 to perform various functions. For example, memory 115 may store software used by the computing device 101, such as an operating system 117, application programs 119, and a data store 121. Alternatively, some or all of the computer executable instructions for computing device 101 may be embodied in hardware or firmware (not shown). As described in detail below, the data store 121 may provide centralized storage (e.g., backup storage) for the entire business, allowing interoperability between different elements of the business residing at different physical locations. In some embodiments, the data store 121 may be physically located external to memory 115. For example, the data store 121 may be an enterprise database located at computing device 151.

Computing device 101 may operate in a networked environment supporting connections to one or more remote computing devices (e.g., remote database systems), such as devices 141 and 151. The computing devices 141 and 151 may be personal computing devices or servers that include many or all of the elements described above relative to the computing device 101. The network connections depicted in FIG. 1 include a local area network (LAN) 125 and a wide area network (WAN) 129, but may also include other networks. When used in a LAN networking environment, computing device 101 is connected to the LAN 125 through a network interface or adapter in the communications module 109. When used in a WAN networking environment, the server 101 may include a modem in the communications module 109 or other means for establishing communications over the WAN 129, such as the Internet or intranet 131. It will be appreciated that the network connections shown are illustrative and other means of establishing a communications link between the computing devices may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
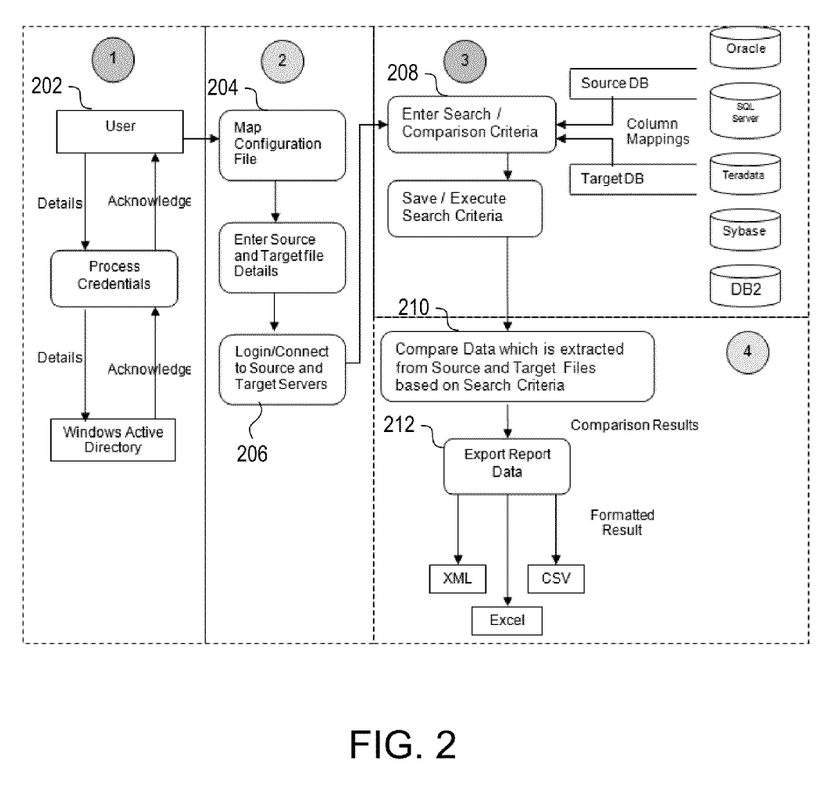
FIG. 2 illustrates a high-level process flow in accordance with various illustrative aspects of the disclosure.

FIG. 2 illustrates a high-level process flow of a system in accordance with aspects of the disclosure. A user 202 may provide details (e.g., username and password) about himself/herself to an authentication module that processes these credentials and sends them to, where the credentials may be verified. The authenticated user 202 may access a tool to create or update (in step 204) a configuration file that stores information (e.g., source identifier, target identifier) about a source data store (e.g., system 141) and a target data store (e.g., system 151). The configuration file may contain information such as the login and password for accessing the data stores and the name of a particular database storing the desired information. In addition, the configuration file may include the IP address, port number, and/or network name of the computing device running the source database system. The configuration file may also include similar information for the target database system, which may be running on a same or different computing device separate from that of the source database system. One skilled in the art will appreciate that although systems 141 and 151 are illustrated in FIG. 1 as computer terminals, they are not so limited. Rather, system 141 and 151 may represent a database software system with a data store holding information in a same or different relational database format. Moreover, the data may be stored in formats other than relational database formats. For example, IMS databases (e.g., object-oriented databases) and other types of databases are known in the database arts and are contemplated for use in this disclosure.

In step 206, the information in the configuration file may be used to login and connect to the source data store and/or target data store. In some embodiments, the source and/or target may be a data file. In such instances, the login and connect steps may be optional.

Figure 3:
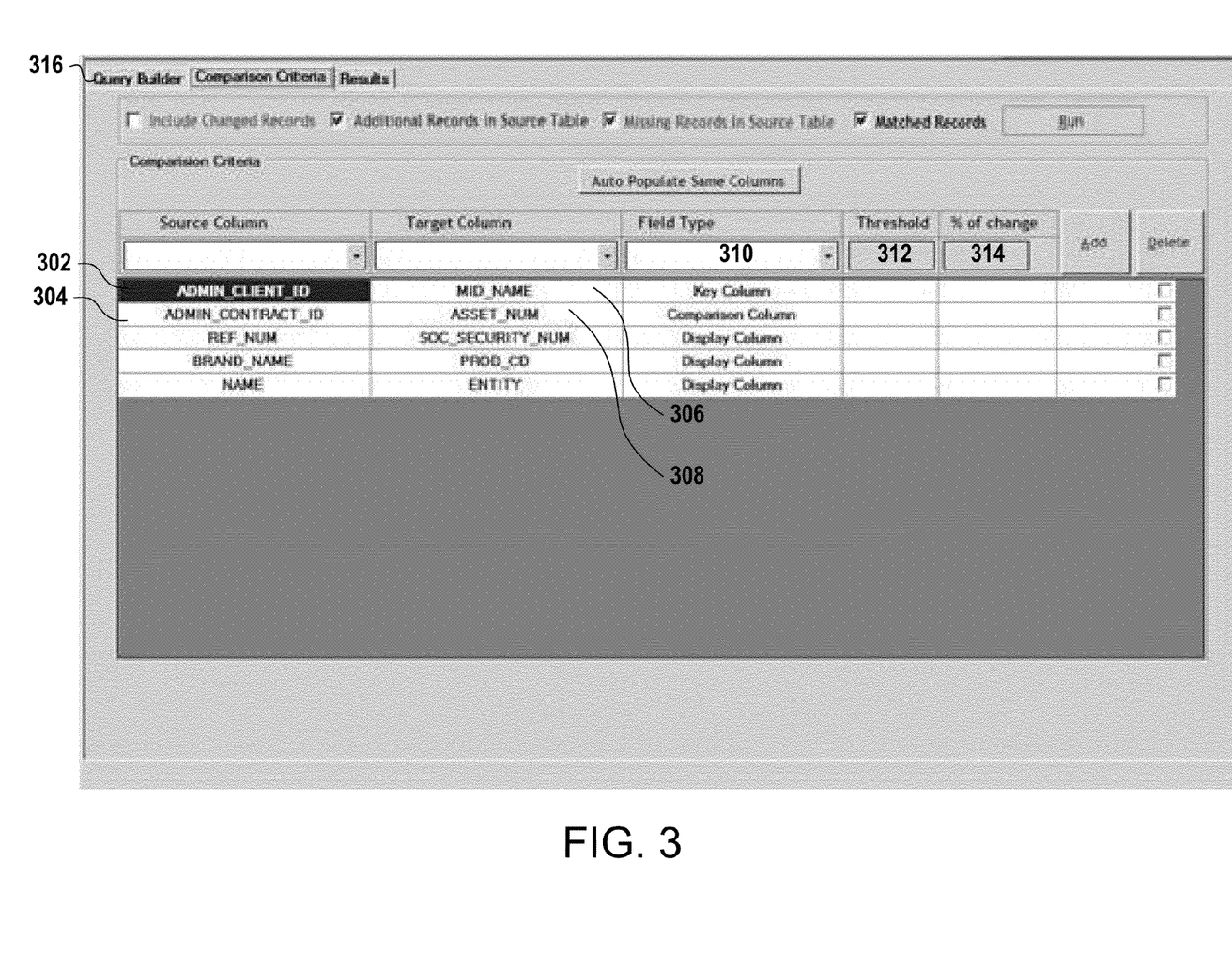
FIG. 3 illustrates an exemplary graphical user interface in accordance with various illustrative aspects of the disclosure.

In step 208, the comparison information may be retrieved from memory of the computing device 101. Alternatively, the comparison information may be provided at that time by a user 202 of the tool. FIG. 3 depicts an example of a graphical user interface that may be provided to a user 202 to assist in entering comparison information. Aspects of that graphical user interface will be described in greater detail in conjunction with FIG. 3. Once the comparison information is entered, the appropriate database systems (e.g., system 141, system 151, and so on may be queried to locate the desired stored data. The desired data from the source system and the target system may be copied to a local data store (e.g., data store 121) where it can be compared using a processor 103 of the computing device 101.

In an alternate embodiment, in addition to, or in lieu of, being compared, the data may be transitioned from the source data to the target data store according to the comparison information. The transitioning of the data may include more than simple copying of the data from one place to another. Rather, in some embodiments, transitioning may include applying a function (e.g., mathematical operation, conversion between currencies, change in formatting) to the data copied from the source data store (e.g., data corresponding to a particular column identifier) and writing the resulting data from the function operation to the target data store.

In step 210, a processor 103 may generate a score based on a comparison of the source data source to the target data store according to the comparison information. If the processor 103 determines that the score meets predetermined comparison parameters (e.g., it meets a threshold value, and/or it meets a percentage of change value) then a report may be generated (in step 212) indicating whether the transition was a success or a failure. The threshold value and percentage of change value features will be discussed in greater detail in relation to the description of FIG. 3 below.

FIG. 3 shows an illustrative graphical user interface in accordance with various aspects of the disclosure. The graphical user interface may be generated by a processor 103 executing computer-executable instructions stored in memory 115, and may be displayed on a video display device 111. The graphical user interface may include a mechanism by which a user 202 may select a data/column identifier 302 from a source data store and another data/column identifier 304 from the source data store. The graphical user interface may also permit a user 202 to select a column identifier 306 from a target data store. The user 202 may also select another column identifier 308 from the target data store. The graphical user interface allows the user 202 to map the selected data/column identifiers among the different data stores. For example, in FIG. 3, the identifier for ADMIN_CLIENT_ID 302 in the source data store is mapped to the MID_NAME 306 in the target data store. Meanwhile, the ADMIN_CON-TRACT_ID identifier 304 in the source data store may be mapped to the ASSET_NUM identifier 308 in the target data store.

The graphical user interface also may permit a "field type" 310 designation for a particular identifier mapping. For example, in the identifier 302 to identifier 306 mapping, FIG. 3 shows a "field type" designation of "Key Column." The "Key Column" may be used to match the records between source and target tables. In an alternate embodiment, the "Key Column" designation may be used for data extraction from the source to the target. Meanwhile, in the identifier 304 to identifier 308 mapping, FIG. 3 shows a "field type" designation of "Comparison Columns." The "Comparison Columns" designation may be used for data comparison. For example, the "Comparison Column" may be used to compare the records between source and target tables for the records where "Key Column" are matching. Yet another "field type" designation (not show in FIG. 3) may be "Display Columns." The "Display Columns" designation may be used for the generation of reports and for display purposes. For example, the "Display Column" may be used to represent the columns a user wants to include in a comparison report other than "Key Column" and "Comparison Column" types.

In addition, the graphical user interface of FIG. 3 may permit designation of a predetermined comparison parameter. Input field 312 permits entry of a threshold value for comparison purposes. In one embodiment, the threshold value is the amount up to which the difference in the source and target will be disregarded during comparison. For example, entering "10" in the threshold value 312 will cause any database records/data with differences (i.e., a score based on the comparison) between the source and target up to 10 (e.g., less than or equal to 10) to be disregarded. Any differences above 10 will be included in the changed rows identified by the tool. For example, in instances where the source and/or target are a numeric (or currency data type), the threshold feature may be applied. Assuming the account balance value in a source table is $3,620 and the account balance in a target table is $3,611, then he comparison is the absolute value of the difference, which is $9. If the threshold value is set to "10," then the difference in the comparison will be disregarded because the difference is less than the threshold value. If the absolute difference is greater than the threshold value, then a comparison report may reflect that the record has changed.

In addition, the graphical user interface of FIG. 3 may permit designation of a predetermined comparison parameter through entry of a percentage of change value. Input field 314 permits entry of a percentage of change value for comparison purposes. In one embodiment, the percentage of change value is the percentage up to which the difference in the source and target will be disregarded during comparison. For example, entering "5" in the percentage of change value 314 will cause any database records/data with differences (i.e., a score based on the comparison) between the source and target up to 5 percent (e.g., less than or equal to 5 percent) to be disregarded. Any differences above 5 percent will be included in the changed rows identified by the tool. As with threshold, the percentage of change feature may apply in instances where the data type is numeric or a currency. In one example, the percentage of change feature may involve the following calculations:

$$X = \text{Absolute}(\text{SourceValue} - \text{TargetValue});$$

If (SourceValue>=TargetValue), Then
    HighValue=SourceValue, Else
    HighValue=TargetValue;

PercentageChange=(X/HighValue)*100; and (PercentageChange>5), Then ChangedRecord, Else IdenticalRecord.

In other words, if the percentage change is greater than the value set (e.g., "5" in the example above), then the record is flagged as changed.

Furthermore, in some embodiments, search queries may be entered into input field 316 to permit transition and comparison between a customized dataset. Although the tool embodied in accordance with the disclosure is intended to circumvent the need for complex technical knowledge into database querying language (e.g., SQL queries), field 316 provides an additional add-on feature for those users 202 that wish to further customize the comparison information.

Figure 4:
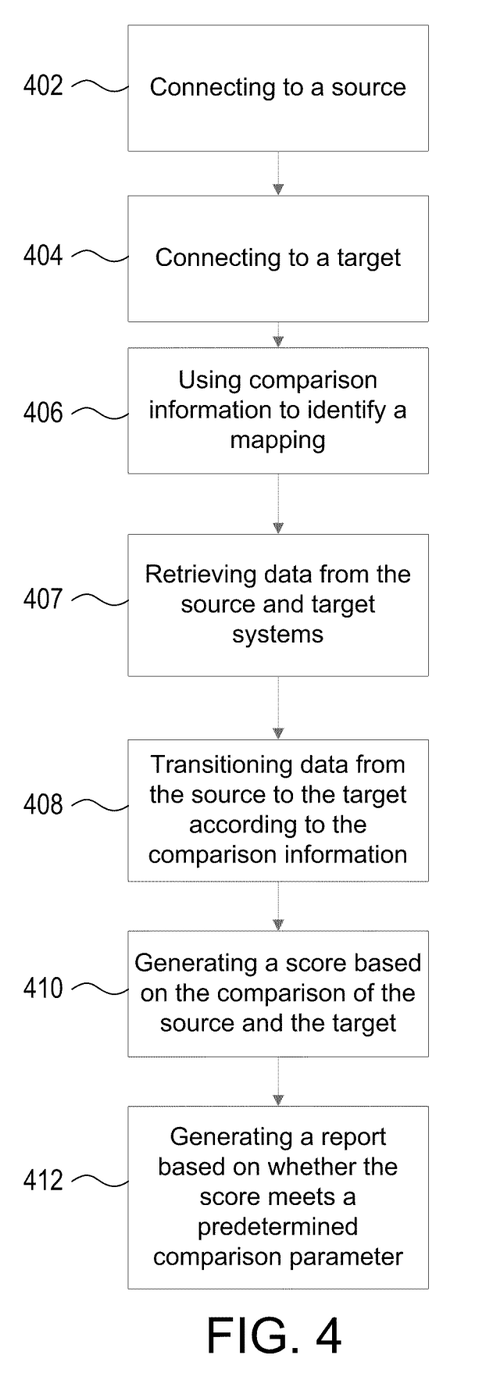
FIG. 4 illustrates a flowchart of a method performed in accordance with various illustrative aspects of the disclosure.

FIG. 4 illustrates method steps in accordance with aspects of the disclosure. In step 402, the computing device 101 connects with a source (e.g., source database system or source data store) and, in step 404, also connects with a target (e.g., target database system or target data store). In some embodiments, the source data store may include a data file from which it is desirable to transition data. Moreover, the target data store may be part of a database system such that the data transitioned to the target is organized into tables (e.g., relational database tables). In another embodiment in accordance with various aspects of the disclosure, the source and target may be located on the same physical system (e.g., both on system 151) or on a single database system. One skilled in the art of database management will appreciate that there are numerous configurations contemplated by the disclosure including, but not limited to, data flow from same or different servers (e.g., the source and target are a single database system), data flow from a flat file to a relational database, data flow from one relational database to another relational database. For example, data from a source may be transitioned into two different relational database tables on the same database system of the target.

In step 406, the computing device 101 may use comparison information to identify a mapping between the source and target, as described in detail above. In step 408, the computing device may transition data from the source to the target according to the comparison information referenced in step 406. The transitioning step 408 may in some embodiments include simple copying of the data. In another embodiment, the transitioning step 408 may include data from two columns from the source being aggregated into a single column in the target. For example, a first subtotal column and a second subtotal column in the source may be mathematically summed into a single "total" column in the target. In yet another embodiment, the transitioning step 408 may include a "last updated" column in the source being compared with a predetermined date value to identify data entries more recent than the predetermined date. That customer data, for example, associated with those identified data entries may then be copied from the source to the target. One skilled in the art of database management will appreciate after review of the entirety disclosed here that other examples of transitioning data in step 408 are contemplated by the disclosure. Moreover, one skilled in the art will appreciate that security/privacy requirements in banking may caution against the copying of data in step 408. Rather, in an alternate embodiment, the data may be compared in step 406 and then simply validate the transitioned data in step 408.

In step 410, the computing device 101 may calculate a score based on the comparison of the source and target. If the generated score fails to meet a predetermined comparison parameter (e.g., threshold value or percentage change value), then a successful or failure report may be generated accordingly.

In an alternate embodiments in accordance with various aspects of the invention, the computing device 101 may retrieve (in step 407) data from the source to local data store 121, and from the target to the local data store 121. After data has been copied, the computing device 101 may compare the two datasets to determine a comparison score. At least one benefit of such a feature is that the data comparison is unbiased and performed in a well-controlled environment.

Although the steps in FIG. 4 have been visually depicted as in a particular order, the disclosure contemplates one or more steps being performed in a different order or being omitted. For example, steps 402, 404, and 406 may be performed in advance for performance reasons. For example, step 406 may be performed well in advance such that the mapping between the database systems is known. Meanwhile, step 407 may be omitted in some embodiments where the system is being used to copy data from a source to a target, and not to validate a prior data transition. Moreover, some steps may be performed through a batch process (e.g., daily overnight) to enhance the responsiveness and delay in the envisioned system.

Although not required, one of ordinary skill in the art will appreciate that various aspects described herein may be embodied as a method, a data processing system, or as a computer-readable medium storing computer-executable instructions. Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. In addition, the steps described herein may be performed using a processor executing computer-executable instructions stored on a computer-readable medium. The processor may also be in communication with a display screen (or other output device, e.g. printer) for outputting the appropriate information in accordance with aspects of the invention. Moreover, the graphical user interface may be provided in a similar fashion through a web browser interface.

We claim:

1. A computer-readable storage medium storing computer-executable instructions that when executed cause a system to perform steps comprising:
   receiving a source identifier of a source data store;
   receiving a target identifier of a target data store;
   displaying a graphical user interface configured to receive comparison information, wherein the comparison information comprises a first identifier and a second identifier of the source data store, a first identifier of the target data store, and a mapping among the identifiers, wherein the first identifier of the source data store identifies customer data in the source data store, and wherein the second identifier of the source data store identifies a last-updated date in the source data store;
   transitioning the customer data identified by the first identifier of the source data store from the source data store to the target data store according to the comparison information, wherein the transitioning is based on a determination that the last-updated date is more recent than a predetermined date;

comparing the customer data identified by the first identifier of the source data store to data identified by the first identifier of the target data store;

based on the comparing, generating a score based on a difference between the customer data identified by the first identifier of the source data store and the data identified by the first identifier of the target data store;

determining whether the score meets a predetermined comparison parameter; and generating a success report when the score meets the predetermined comparison parameter.

2. The computer-readable storage medium of claim 1, wherein the target data store is a part of a database system.

3. The computer-readable storage medium of claim 1, wherein the data identified by the first identifier of the target data store is a function of the customer data identified by the first identifier of the source data store.

4. The computer-readable storage medium of claim 1, wherein the predetermined comparison parameter is a threshold value, and wherein determining whether the score meets the predetermined comparison parameter comprises determining whether the score is less than the threshold value.

5. The computer-readable storage medium of claim 4, wherein generating the success report further comprises:
if the score is less than the threshold value, displaying an indication that a record has changed; and
if the score is more than the threshold value, displaying an indication that the record has not changed.

6. The computer-readable storage medium of claim 1, wherein the predetermined comparison parameter is a percentage of change value, and wherein determining whether the score meets the predetermined comparison parameter comprises determining whether the score is less than the percentage of change value.

7. The computer-readable storage medium of claim 1, wherein the comparison information comprises a second identifier of the target data store, and wherein the first identifier and the second identifier of the target data store correspond to different relational tables of the target data store.

8. The computer-readable storage medium of claim 1, wherein:
comparing the customer data identified by the first identifier of the source data store to the data identified by the first identifier of the target data store further comprises:
determining a first value of the customer data identified by the first identifier of the source data store; and
determining a second value of the data identified by the first identifier of the target data store; and
generating the score based on the difference further comprises:
generating a difference between the first value and the second value, wherein the score is the generated difference.

9. The computer-readable storage medium of claim 8, wherein:
determining whether the score meets the predetermined comparison parameter further comprises:
determining that the generated difference is less than the predetermined comparison parameter; and
the success report is generated in response to determining that the generated difference is less than the predetermined comparison parameter.

10. The computer-readable storage medium of claim 1, wherein the comparing the customer data identified by the first identifier of the source data store to the data identified by the first identifier of the target data store further comprises:

copying the customer data identified by the first identifier of the source data store to a local data store;
copying the data identified by the first identifier of the target data store to the local data store; and
comparing the copied data identified by the first identifier of the source data store to the copied data identified by the first identifier of the target data store.

11. A method comprising:
connecting to a source database system;
connecting to a target database system;
using comparison information to identify a mapping of a first identifier of the source database system to a first identifier of the target database system, wherein the first identifier of the source database system identifies customer data in the source database system, and wherein a second identifier of the source database system identifies a last-updated date in the source database system;
transitioning the customer data identified by the first identifier of the source database system from the source database system to the target database system according to the comparison information, wherein the transitioning is based on a determination that the last-updated date is more recent than a predetermined date;
retrieving the customer data from the source database system and data from the target database system to a local data store, according to the comparison information;
comparing the customer data retrieved from the source database system to the data retrieved from the target database system;
based on the comparing, generating, using an electronic processor, a score based on a difference between the customer data retrieved from the source database system and the data retrieved from the target database system;
determining whether the score meets a predetermined comparison threshold value; and
generating, using the processor, a failure report when the score fails to meet the predetermined comparison threshold value.

12. The method of claim 11, wherein the transitioning step comprises:
applying a function to the customer data identified by the first identifier of the source database system; and
copying the data resulting from the applying step to the target database system.

13. The method of claim 12, wherein the function comprises a conversion from a first currency to a second currency.

14. A system comprising at least a processor and a memory storing computer-executable instructions that when executed by the processor, cause the system to perform steps comprising:
connecting to a source database system;
connecting to a target database system;
transitioning customer data identified by a first identifier of the source database system from the source database system to the target database system according to a mapping of the first identifier of the source database system to a first identifier of the target database system, wherein the transitioning is based on a determination that a last-updated date identified by a second identifier of the source database system is more recent than a predetermined date;
comparing the customer data identified by the first identifier of the source database system to data identified by the first identifier of the target database system;
based on the comparing, generating, using the processor, a score based on a difference between the customer data identified by the first identifier of the source database system and the data identified by the first identifier of the target database system after the transitioning;

determining whether the score meets a predetermined comparison parameter; and generating, using the processor, a successful report when the score meets the predetermined comparison parameter.

15. The system of claim 14, wherein the predetermined comparison parameter is a threshold value.

16. The system of claim 14, wherein the predetermined comparison parameter is a percentage of change value.

17. The system of claim 14, wherein the transitioning comprises:

applying a function to the customer data from the source database system; and copying the data resulting from the applying to the target database system, wherein the function is a conversion from a first currency to a second currency.

* * * * *